(12) United States Patent
Vogler et al.

(10) Patent No.: US 10,488,856 B2
(45) Date of Patent: Nov. 26, 2019

(54) METHOD FOR MONITORING AN ENVIRONMENT OF A VEHICLE

(71) Applicant: Robert Bosch GmbH, Stuttgart (DE)

(72) Inventors: Axel Vogler, Stuttgart (DE); Hans-Leo Ross, Lorsch (DE); Manuel Carrara, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 15/864,441

(22) Filed: Jan. 8, 2018

(65) Prior Publication Data

US 2018/0203441 A1   Jul. 19, 2018

(30) Foreign Application Priority Data

Jan. 16, 2017   (DE) .................. 10 2017 200 574

(51) Int. Cl.
*G05D 1/00*   (2006.01)
*B60Q 1/24*   (2006.01)
*G05D 1/02*   (2006.01)

(52) U.S. Cl.
CPC ............ *G05D 1/0011* (2013.01); *B60Q 1/24* (2013.01); *G05D 1/0231* (2013.01); *G05D 1/0282* (2013.01); *G05D 2201/0213* (2013.01)

(58) Field of Classification Search
CPC .. G05D 1/0011; G05D 1/0231; G05D 1/0282; G05D 2201/0213; B60Q 1/24
See application file for complete search history.

(56) References Cited

U.S. PATENT DOCUMENTS

| | | | |
|---|---|---|---|
| 2008/0266396 A1 | 10/2008 | Stein | |
| 2018/0095457 A1* | 4/2018 | Lee | ............... G05D 1/0022 |
| 2019/0012537 A1* | 1/2019 | Heimberger | ........... G06T 7/246 |

FOREIGN PATENT DOCUMENTS

| | | |
|---|---|---|
| DE | 102004011780 A1 | 10/2005 |
| DE | 102012025317 A1 | 6/2014 |
| DE | 102014105297 A1 | 10/2015 |
| DE | 102014221751 A1 | 4/2016 |
| EP | 2933754 A2 | 10/2015 |
| JP | 2000146547 A | 5/2000 |

* cited by examiner

*Primary Examiner* — Aaron L Troost
(74) *Attorney, Agent, or Firm* — Norton Rose Fulbright US LLP; Gerard Messina

(57) ABSTRACT

A method for monitoring an environment of a vehicle is provided. The method includes generating an irradiated region in a defined environment of the vehicle using a radiation device of the vehicle. The method also includes detecting the irradiated region is detected using a detection device situated externally to the vehicle, and, in the event that at least partial shadowing of the irradiated region, is detected, controlling the vehicle by a control device situated externally to the vehicle.

11 Claims, 2 Drawing Sheets

METHOD FOR MONITORING AN ENVIRONMENT OF A VEHICLE

CROSS-REFERENCE TO RELATED APPLICATIONS

The present application claims priority under 35 U.S.C. § 119 to DE 10 2017 200 574.2, filed in the Federal Republic of Germany on Jan. 16, 2017, the content of which is hereby incorporated by reference herein in its entirety.

FIELD OF THE INVENTION

The present invention relates to a method for monitoring an environment of a vehicle, to a monitoring device for monitoring an environment of a vehicle, and to a computer program product.

BACKGROUND

In what is known as automatic valet parking, the driver parks his car at a drop-off point and, after an activation of the valet-parking function, the vehicle drives autonomously, i.e., without a driver behind the steering wheel, from that spot to an assigned parking position. Indoor scenarios (e.g., in a parking structure) as well as outdoor scenarios are conceivable in this context.

One important aspect in valet parking is the reliable detection of obstacles inasmuch as the vehicle must maintain a minimum distance from objects, e.g., pedestrians, at all times. Camera systems installed in a parking structure, for example, are used for this purpose. Imaging methods of the mentioned camera systems assume an important part of a control chain within the framework of the high-level automation. The imaging methods mostly operate in visible light and have weaknesses in reliably distinguishing objects featuring similar colors and/or contrasts as separate objects, such as a person wearing dark clothing in front of a dark vehicle.

DE 10 2012 025 317 A1 describes a driver-assistance system and a method for enabling autonomous or piloted garage parking.

EP 2 933 754 A2 describes a method for detecting an object in an environment of a motor vehicle with the aid of a camera system of the motor vehicle. In this instance, a camera records images of the environment of the vehicle and records multiple images featuring an illuminated environment and an environment without illumination. The illumination is provided with the aid of a light source of the vehicle. The recorded images are processed, and a differential image is produced in the process, in which edges and contours are detected that are able to be allocated to objects.

DE 10 2004 011 780 A1 describes an access-control device for monitoring an access region for access by at least one body or a person. The access-control device includes at least one transmit element, which emits light radiation into the access region, and at least one receive element that receives the light radiation. Because at least one means is provided that generates a light field and which emits the light radiation irradiated into the access region in the form of a planar field of light, complete and uninterrupted monitoring of an access region is able to be provided.

SUMMARY

It is an object of the present invention to provide an improved method for detecting an object in the environment of a vehicle.

According to a first aspect, the objective is achieved by a method for monitoring an environment of a vehicle, the method including: generating an irradiated region in a defined environment of the vehicle with the aid of a radiation device of the vehicle, detecting the irradiated region by a detection device disposed externally to the vehicle, and controlling the vehicle, by a control device that is external to the vehicle, in the event that at least partial shadowing of the irradiated region is detected.

Through the generation of an irradiated region, a contrast between an object in front of the vehicle and the vehicle is advantageously able to be increased in a defined manner. This helps in reliably detecting an object or a person that is located in front of the vehicle. As a result, the control device is able to output a suitable command to the vehicle, whereupon the vehicle carries out an appropriate action, e.g., the vehicle does not drive off, stops, executes an evasive maneuver, etc.

In the final analysis, this advantageously helps in shifting a required computer/monitoring infrastructure from the vehicle to an infrastructure (such as a parking building) for the most part, and it makes it possible to produce vehicles in a more cost-effective manner.

The proposed method ultimately allows for the use of a normally already installed illumination device of the vehicle for a safety-relevant functionality of the vehicle.

According to a second aspect, the objective is achieved by a monitoring device for monitoring an environment of a vehicle, the monitoring device including a radiation device of the vehicle, which is designed to generate an irradiated region within a defined environment of the vehicle, a detection device for detecting the irradiated region, a control device, which is designed to control the vehicle in the event that at least partial shadowing of the irradiated region is detected.

In one advantageous further development according to an example embodiment of the present method, the irradiated region is generated with the aid of an interior illumination device of the vehicle. A functional element already installed in the vehicle is thereby usable for another functionality. As a result, the present method is advantageously able to be carried out in a technically uncomplicated manner.

In another advantageous further development according to an example embodiment of the present invention, the irradiated region is produced with the aid of an underbody illumination device of the vehicle. This advantageously makes it possible to use an alternative radiation source for generating the provided contrast between the object/person and the vehicle.

A characterizing feature of another advantageous further development according to an example embodiment of the present method is that the irradiated region is generated with the aid of the radiation device in the non-visible range. The adverse effect on persons can be kept low as a result, and an improved technical functionality of the method is able to be realized.

In another advantageous further development according to an example embodiment of the present method, the radiation device is operated in a defined pulsed manner. This advantageously avoids an adverse effect on persons while simultaneously satisfying criteria imposed by a monitoring institution (e.g., inspection agencies, federal motor vehicle authority, etc.).

In another advantageous further development according to an example embodiment of the present method, at least one radiation source situated externally to the vehicle is additionally used for generating the irradiated region. This allows for a further increase in the contrast between an object/person located in front of the vehicle, and thereby improves the object detection.

Another advantageous further development according to an example embodiment of the present method provides that an assistance system of the vehicle, which is functionally connected to the control device, controls a defined driving maneuver of the vehicle as a function of the detected shadowed irradiated region. A suitable driving maneuver for the vehicle is thereby able to be initiated and carried out with the aid of a driver-assistance system as a function of an object/person detection. The safety level of a driving operation of the vehicle is advantageously increased in this way.

In the following text, the present invention will be described in greater detail with further features and advantages on the basis of a plurality of figures. The figures are mainly meant to illustrate certain principles of the present invention and are therefore developed merely schematically and not necessarily true to scale.

Disclosed method features analogously result from corresponding disclosed device features, and vice versa. This especially means that features, advantages, and embodiments with regard to the method for monitoring an environment of a vehicle similarly result from corresponding embodiments, features, and advantages with regard to a monitoring device for monitoring an environment of a vehicle, and vice versa.

DETAILED DESCRIPTION

In the following text, the term 'vehicle' is used in particular in the sense of a partially automated vehicle, a fully automated vehicle, an autonomous vehicle, and a partially autonomous vehicle. However, a use of the present method is also conceivable for exclusively manually controlled vehicles.

One core idea of the present invention in particular is to provide a method that makes it possible for persons to be safely moving in an environment of a vehicle or to detect an object in an environment of the vehicle in a reliable manner.

In the following text, a mode of action of exemplary embodiments of the proposed method is described with the aid of figures.

Figure 1:
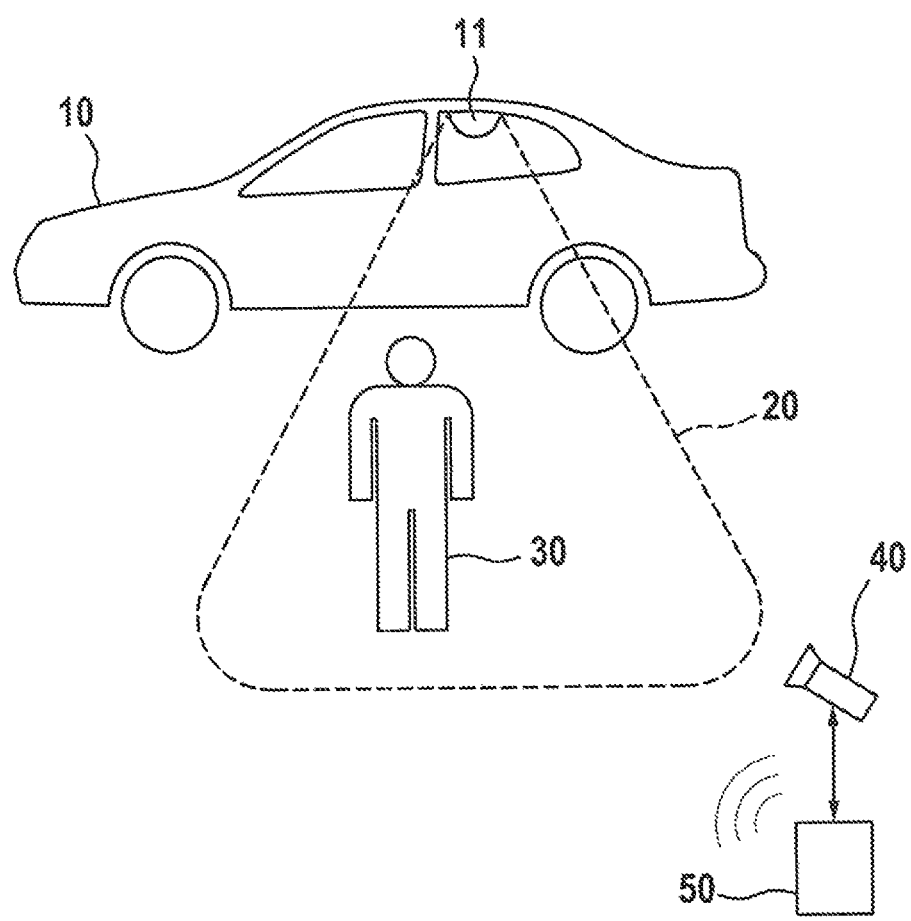
FIG. 1 is a diagram that illustrates a mode of action of a method according to a first example embodiment of the present invention.

FIG. 1 schematically illustrates a scenario of a vehicle 10 that is located in a parking building, for example. There are often locations in parking buildings that are difficult to view, e.g., tight curves. In addition, parking buildings are often dark, which makes it difficult for a detection device 40 (such as a camera) of the parking building to detect a person 30 when this person is located in front of vehicle 10. The reason is that the contrast between person 30 and vehicle 10 is insufficient.

As a result, a required minimum distance between vehicle 10 and the person or object 30 might not always be achievable, which may result in a dangerous situation for person 30.

Therefore, according to example embodiments of the present invention, an irradiated region 20 is generated around vehicle 10 or within a defined environment of vehicle 10 with the aid of a radiation device, such as in the form of an interior illumination device 11 of vehicle 10. This advantageously enhances a contrast between vehicle 10 and person 30, i.e., the object, so that it is easier for a camera 40 of the parking building to detect the person or object 30 (e.g., a child seat that was set down).

In the event that person 30 is present in the environment of vehicle 10, irradiated region 20 will at least partially be shadowed by person 30, and detection device 40 detects the shadowing of irradiated region 20 and transmits the acquired data to a control device 50 that is functionally connected to detection device 40. As a result, control device 50 wirelessly transmits a control command to vehicle 10, whereupon vehicle 10 initiates or performs a suitable driving maneuver, which is carried out by a driver-assistance system, e.g., in the form of a braking and/or evasive maneuver. In an example embodiment, suitable control commands are transmitted to a vehicle actuator system of vehicle 10 via suitable wireless communications technologies such as WLAN, mobile telephony, etc.

As a result, vehicle 10 is prevented from driving off and from thereby endangering person 30 or damaging object 30 or from being damaged by object 30. In this way, the safety level in valet parking scenarios, for example, is advantageously significantly increased.

With the aid of the provided method, a contrast between vehicle 10 and object/person 30 is detected and evaluated in a defined manner through the use of suitable technical means.

Interior illumination device 11 and/or underbody illumination device 12 are able to be controlled by the infrastructure device, just like vehicle 10, the mentioned devices being switched on when leaving what is known as the drop-off zone, for example, or when entering a pick-up zone of a valet-parking environment.

In this manner, the torso and/or the legs of a person/object 30, for example, is/are detectable since this person/object 30 at least partially interrupts the field of irradiated region 20, or in other words, shadows it. Detection device 40 detects vehicle 10 in the process and checks the integrity of irradiated region 20 around vehicle 10 within the sense of a prescribed safety field, e.g., according to ISO-26262 for safety-relevant electrical/electronic systems in motor vehicles. As an optimization in the context of satisfying the cited standard, the radiation device can also emit radiation in non-visible light (e.g., UV radiation, IR radiation, etc.).

Figure 2:
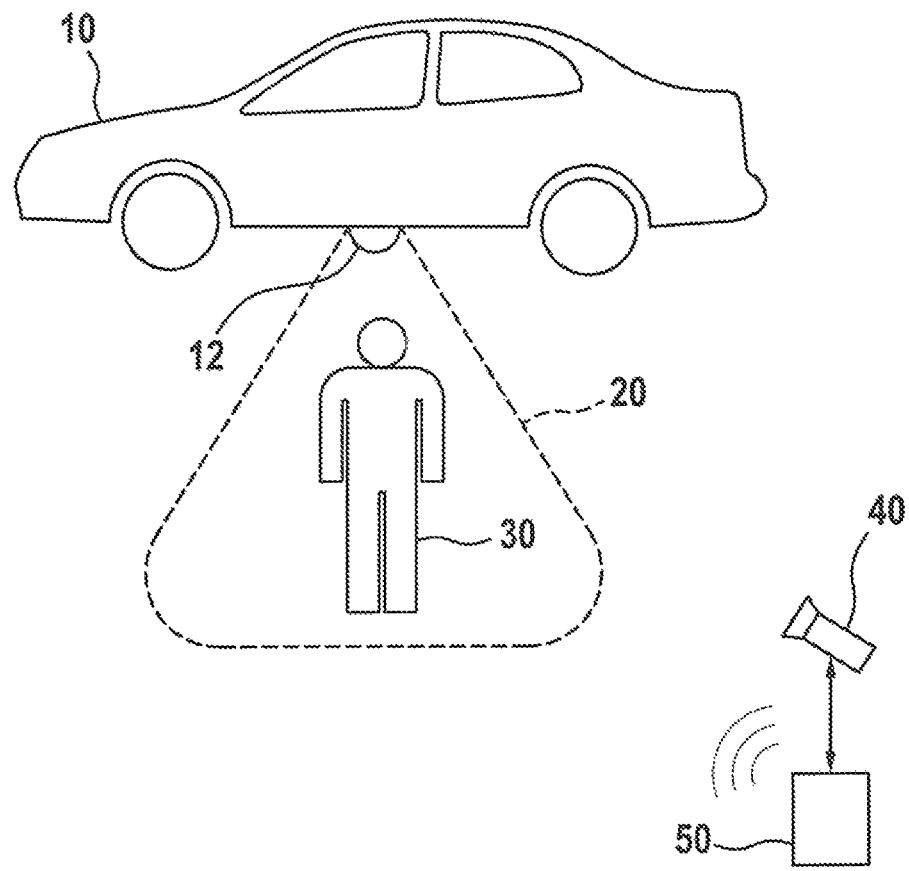
FIG. 2 is a diagram that illustrates a mode of action of a method according to a second example embodiment of the present invention.

In one further alternative of the provided method, an underbody illumination device 12 of vehicle 10 is used for generating irradiated region 20, as can be gathered from FIG. 2. Irradiated region 20 in the environment of vehicle 10 is generated in a defined manner with the aid of underbody illumination device 12 of vehicle 10, and a contrast between person/object 30 and vehicle 10 is enhanced in this manner as well. As a result, person 30 is able to be reliably detected by detection device 40 of the infrastructure device, and vehicle 10 can be prevented from driving off, for example.

As another advantageous further development, in an example embodiment, additional radiation is emitted with the aid of an additional radiation-generating device (not shown) of the infrastructure, so that another irradiated region is generated, which makes it possible to further increase the contrast of person 30 in front of vehicle 10 and to improve the detectability of person 30 even more.

The mentioned radiation device in the form of an interior illumination device 11 and underbody illumination device 12 can be realized with the aid of at least one, and preferably a plurality of, LEDs, for example, which emit permanent radiation in visible light.

In one advantageous further development of the present method, the radiation is emitted in a pulsed manner at defined intervals imperceptible by the human eye in an effort to improve a detection rate of detection device 40.

In one further advantageous development of the present method, detection device 40 or control device 50 connected to detection device 40 implement image-processing algorithms that make it possible to distinguish persons from objects 30, for example, so that different control commands are able to be output to vehicle 10 as a function of detected object/person 30.

The evaluation of the data acquired by detection device 40 can, according to an example embodiment, be carried out with the aid of a separate evaluation device (not shown).

According to an example embodiment, software that is run on control device 50 and/or on detection device 40 and/or an external computer device (not shown) implements the described method, aiding in adaptability of the described method.

Figure 3:
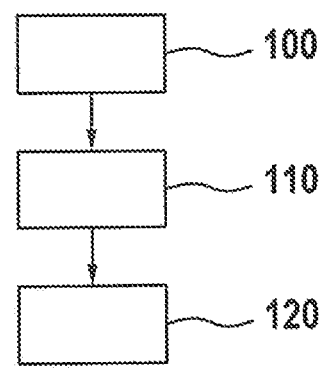
FIG. 3 is a flowchart that illustrates a basic sequence of a method according to an example embodiment of the present invention.

FIG. 3 is a flowchart that illustrates a method for monitoring an environment of a vehicle, according to an example embodiment of the present invention. In a step 100, an irradiated region 20 is produced in a defined environment of vehicle 10 with the aid of a radiation device 11, 12 of vehicle 10.

In a step 110, irradiated region 20 is detected with the aid of a detection device 40, which is disposed externally to vehicle 10.

In a step 120, in the event that at least partial shadowing of irradiated region 20 is detected, a control of vehicle 10 is carried out using a control device 50 situated externally to vehicle 10.

In summary, the present invention provides a method and a device by which an environment of a vehicle is able to be monitored in a considerably better manner, which significantly increases the safety of a person located in the environment of a vehicle. Technical means (computer devices, detection devices, control devices, etc.) used for this purpose are for the most part disposed in an infrastructure external to the vehicle, which makes it possible to realize the present method at a high detection rate with the aid of cost-effective vehicles.

One skilled in the art can modify and/or combine the afore-described features of the present invention in a suitable manner without departing from the core of the present invention.

What is claimed is:

1. A method for monitoring an environment of a vehicle, the method comprising: detecting, by a detection device that is external to the vehicle, an irradiated region generated at least partially by a radiation device of the vehicle in a defined environment of the vehicle; and responsive to a detection, in the detecting step, of an at least partial shadowing of the irradiated region, controlling the vehicle by a control device that is external to the vehicle.

2. The method of claim 1, wherein the radiation device is an internal illumination device of the vehicle.

3. The method of claim 2, wherein the irradiated region is generated using at least one LED.

4. The method of claim 3, wherein the radiation device is operated in a defined pulsed manner.

5. The method of claim 2, wherein the irradiated region is produced in an invisible range.

6. The method of claim 5, wherein the radiation device is operated in a defined pulsed manner.

7. The method of claim 1, wherein the radiation device is an underbody illumination device of the vehicle.

8. The method of claim 1, wherein at least one radiation source that is situated externally to the vehicle contributes to the generation of the irradiated region.

9. The method of claim 1, wherein the controlling includes controlling an assistance system of the vehicle, which is functionally connected to the control device, thereby controlling a defined driving maneuver of the vehicle.

10. A monitoring device for monitoring an environment of a vehicle, the device comprising: a detection device that is external to the vehicle and that is configured to detect at least partial shadowing of an irradiated region generated at least partially by a radiation device of the vehicle in a defined environment of the vehicle; and a control device that is external to the vehicle and that is configured to control the vehicle in response to the detection.

11. A non-transitory computer-readable medium on which are stored instructions that are executable by a processor that is external to a vehicle and that is in communication with a detection device that is external to the vehicle, wherein the instructions, when executed by the processor, cause the processor to perform a method for monitoring an environment of the vehicle, the method comprising:
  controlling the vehicle in response to a detection, by the detection device, of at least partial shadowing of an irradiated region generated at least partially by a radiation device of the vehicle in a defined environment of the vehicle.

* * * * *